Aug. 29, 1967 G. A. KNORR, JR., ET AL 3,339,019
TELEVISION RECEIVER UTILIZING THE HORIZONTAL OUTPUT
TRANSFORMER AS A PILOT LIGHT POWER SOURCE
Filed Nov. 12, 1964

INVENTORS
Gustave A. Knorr, Jr. &
Harry W. Claypool.
BY

United States Patent Office 3,339,019
Patented Aug. 29, 1967

3,339,019

TELEVISION RECEIVER UTILIZING THE HORIZONTAL OUTPUT TRANSFORMER AS A PILOT LIGHT POWER SOURCE

Gustave A. Knorr, Jr., Atlantic Highlands, and Harry W. Claypool, North Brunswick, N.J., assignors to Westinghouse Electric Corporation, Pittsburgh, Pa., a corporation of Pennsylvania Filed Nov. 12, 1964, Ser. No. 410,656
5 Claims. (Cl. 178—7.3)

Figure 1:
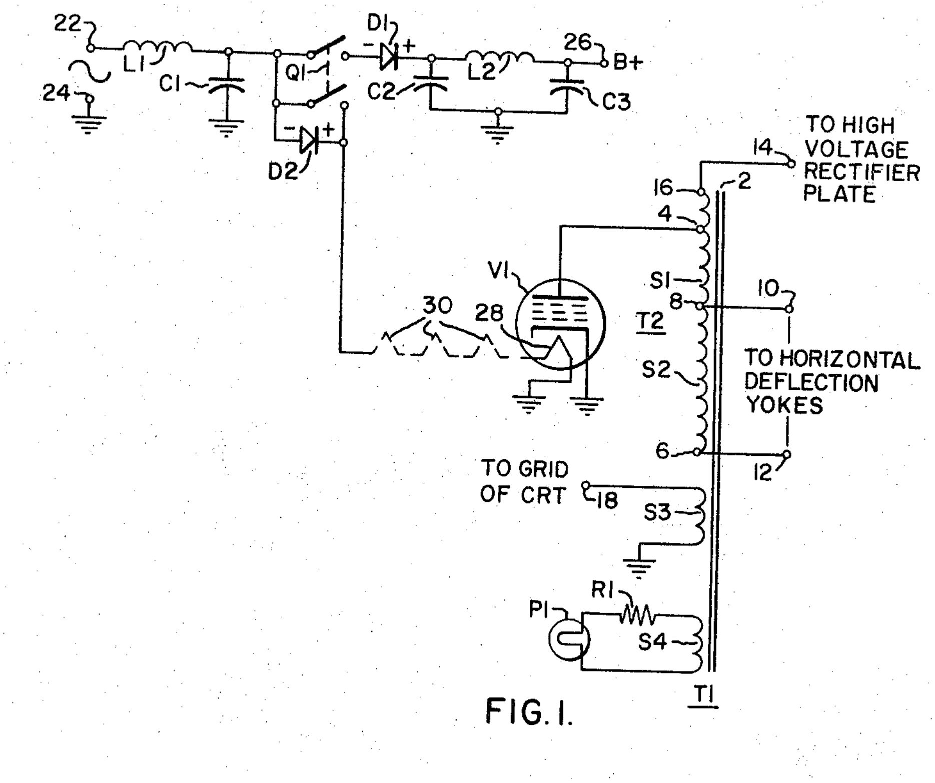

The present invention relates to an illumination source for electronic receiving apparatus, and more particularly to an illumination source for television receivers.

In television receivers which supply current at a reduced rate to the heater or filament circuits of the various tubes of the receiver when it is in its nonreceiving condition, a problem arises of providing a convenient and economical source of illumination for the receiver when it is turned on. Various sources of illumination have been used or proposed, however, without complete satisfaction. For example, if a television receiver utilizes a power transformer, the driving voltage for a pilot light could be found in the 6.3 volt filament winding of the power transformer. Since, however, when the receiver is turned off the idling voltage of the filament does not decrease sufficiently to extinguish completely the pilot light, an additional switch must then be added to turn-off completely this light. It thus becomes necessary to provide a special on-off switch which is ganged to the normal on-off switch if one knob control is to be maintained. The special switch, of course, is an additional cost in the set. If a line voltage type of power supply is used in the receiver, it may be thought that a pilot light could be conveniently inserted in series with the tube filament string. The convenience of this, however, is set off by attendant problems. For example, the pilot light not being isolated presents a serious shock hazard to the user. Also, heating current being supplied during stand-by prevents the pilot light from completely extinguishing. Furthermore, the on-off current surges in the pilot light will prematurely shorten its life cycle. Finally, the filament string being open circuited when the pilot light fails, the entire set will be inoperative until this light is replaced. These problems which arise in the line-type power supply may be overcome, but at the cost of a separate transformer will act as a source of illuminating power.

It is, therefore, an object of the present invention to provide a new and improved source of illumination for a television receiver.

It is a further object of the present invention to provide a new and improved source of illumination for a television receiver which is economical and long lived.

It is still a further object of the present invention to provide a new and improved source of illumination for use in a television receiver which does not interfere with the normal operation of the receiver.

Generally, the present invention provides a source of illumination for a television receiver by means of a winding inductively coupled to the horizontal output transformer of the television receiver to supply power to an illuminating device which is responsive to the energization of the horizontal output transformer when the television receiver is in its on condition.

Figure 2:
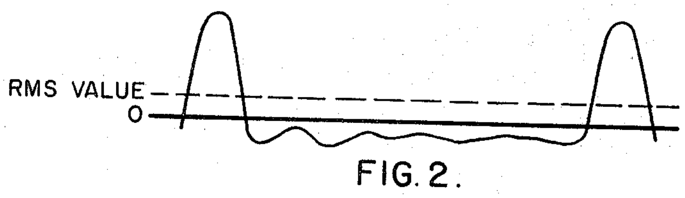

These and other objects and advantages of the present invention will become more apparent when considered in view of the following specification and drawings, in which:

FIGURE 1 is a schematic diagram of the illumination source of the present invention; and FIG. 2 is a waveform diagram illustrating driving voltage for the illumination source.

Referring to FIG. 1, a portion of the horizontal sweep circuit of a typical television receiver is shown including a horizontal output transformer T1. The horizontal output transformer T1, sometimes called the fly-back transformer, includes a core 2, upon which a plurality of windings are disposed. The horizontal output transformer comprises an autotransformer T2 having a primary winding S1 between a tap 4 and the bottom end 6 of the coil and a secondary winding taken between a tap 8 and the end 6 of the winding. The input to the primary winding S1 is applied at the tap 4 from the plate of a horizontal output amplifier tube V1. As is well known the tube V1 receives a trapezoidal voltage waveform at 15,750 cycles. The output from the secondary winding S2 is taken from a pair of terminals 10 and 12 connected thereacross. The output at terminals 10 and 12 produces a sawtooth current waveform through the horizontal deflection yoke of the receiver as is well known.

A terminal 14 is connected to the top end 16 of the autotransformer T2. The output at the terminal 14 is to be applied to the high voltage rectifier, not shown, of the receiver which is also well known.

A separate winding S3 is disposed about the core 2 of the transformer T1 and has one end grounded and the other end connected to a terminal 18. The winding S3 is a blanking pulse winding which supplies a negative pulse voltage during the retrace cycle of the horizontal scan. The negative blanking pulse from the winding S3 is applied from the terminal 18 to a grid of the cathode ray tube of the television receiver. The horizontal sweep circuit as described so far is well known in the art, and it thus will not be described in more detail.

The illumination source of the present invention is incorporated into the above-described standard horizontal sweep circuit as follows. A coil S4 is wound about the core 2 of the fly-back transformer T1. The coil S4 is inductively coupled to the transformer T1 and thus a current will be induced therein in response to current flow in the other windings of the transformer. A waveform of the voltage appearing across the winding S4 is shown in FIG. 2. This waveform has a frequency of 15,750 cycles per second and will have peaks as shown. The R.M.S. value of the waveform is indicated by the dotted line. A pilot light P1 and a resistor R1 are connected in series across the coil S4. The resistor R1 is a current limiting resistor which may or may not be required depending upon the R.M.S. volts per turn ratio between the windings S1 and S4 and the power requirements of the pilot light P1. The light P1 may, for example, be a small incandescent or neon lamp selected to be sufficiently illuminated by an R.M.S. voltage as shown in FIG. 2.

In FIG. 1, the television set is shown to be in its off condition. Thus, the pilot light P1 will not provide any illumination since the horizontal output transformer T1 will not be energized.

The circuit of FIG. 1 shows a line connected type of power supply. Across a pair of input terminals 22 and 24, the latter being grounded, a source of alternating potential is applied, which may be at 120 volts, 60 cycles. A filtering network including an inductor L1 and a capacitor C1 is connected across the terminals 22 and 24. An on-off switch Q1 is connected to the junction between the inductor L1 and the capacitor C1. The switch Q1 is shown schematically to be of the single throw, double pole variety. In series with the switch Q1 is connected a diode D1 which provides a half-wave rectified output at its cathode electrode. This output is then filtered in a filter network including capacitors C2 and C3 connected across an inductor L2. A filtered unidirectional B+ voltage is thus provided at a terminal 26 connected across the filter network. A diode D2 is connected across the switch D1. Even though the television receiver as shown is in its nonreceiving off state, with the B+ potential open circuited from the receiver, a current path is provided to the heater elements of the various tubes of the receiver, including the heater element 28 of the horizontal output tube V1. This current path is provided from the terminal 22, through the inductor L1, a diode D2, connected across the switch Q1, a plurality of heater elements 30, shown schematically by dotted lines, and the heater element 28, to ground. Of course, other heater elements or filament circuits may be included in the chain.

Therefore, during the off condition of the television receiver a half-wave rectified heating current is supplied through the heater or filament circuits of the various tubes of the receivers. This current being at reduced amplitude will maintain the tubes in a heated condition less than their normal operating temperature. When the television receiver is turned on by closing the switch Q1, picture and sound will be provided since the tubes are already partially heated.

Closing the switch Q1 shorts out the diode D2 providing a direct path for the full alternating potential from the input source to be applied to the heater elements 30 and the heater element 28 of the horizontal output tube V1. Also, the closing of switch Q1 connects the input source through the filter network and diode D1 so as to provide a B+ potential at the terminal 26. With B+ potential being supplied in the television receiver, the various tubes of the receiver will become operative. The tube VI becoming operative will supply its output scanning waveform, which will energize the primary winding S1 of the horizontal output transformer T1. The flow of current in the winding S1 will, in turn, provide the necessary drive for the horizontal deflection yoke across the secondary winding S2 at the terminals 10 and 12. Due to the flow of current in the transformer T1, a voltage will be induced in winding S4 which will have the waveform as shown in FIG. 2. The pilot light P1 being connected in series with the winding S1 will then be energized to illumination by the induced voltage in the coil S4 having an R.M.S. value as shown by the dotted line in FIG. 2.

It can thus be seen that the pilot light will only be operative to supply light when the television set is in its on position, with the horizontal output transformer T1 being energized by the tube V1 when the B+ potential and full heating current are applied thereto. If the on-off switch Q1 is opened, the B+ potential will be moved from the tube V1 so that the transformer T1 will no longer be energized. With the deenergization of the transformer T1, the pilot light P1 will be extinguished because of the lack of a driving potential.

The illumination source of the present invention, of course, may be utilized with a television receiver not supplying stand-by current to the tube filaments when the set is in its off condition. In this case, however, there would be a delay due to the time required for the various tubes to heat up and supply an output to the horizontal output transformer. The pilot light would, however, extinguish immediately upon turning off the set. Also, by applying the coil S4 to the horizontal output transformer, the transformer is loaded down by the light L1, the coil S4 and the resistor R1 so as to improve the regulation of the scanning current through terminals 10 and 11.

Another advantage of providing the drive for pilot lighting from the horizontal output transformer is that the pilot light may serve as a trouble indicator to the serviceman pin-pointing a malfunction in the high voltage portion of the receiver.

Although the present invention has been described with a certain degree of particularity it should be understood that the present disclosure has been made only by way of example and that numerous changes in the details of circuitry and the combination and arrangement of components and elements may be resorted to without departing from the spirit and the scope of the present invention.

We claim as our invention:

1. An illumination source for use in a television receiver having therein a horizontal output transformer, said illumination source comprising, a winding inductively coupled to said horizontal output transformer and an illumination device operatively connected to said winding and being responsive thereto to provide a light output upon the energization of said transformer.

2. An illumination source for use in a television receiver which supplies a reduced heating current to the tubes of the receiver when in its non-receiving condition, said television set having therein a horizontal output transformer, said illumination source comprising, a winding inductively coupled to said horizontal output transformer and an illumination device operatively connected across said winding and being responsive thereto to provide a light output upon the energization of said transformer when said receiver is in its receiving condition.

3. An illumination source for use in a television receiver having therein a horizontal output transformer including a core member, said illumination source comprising, an electromagnetic coil disposed on the core members of said horizontal output transformer being inductively coupled to said transformer and a current responsive illumination device connected across said coil winding and being responsive to provide a light output upon the energization of said transformer.

4. An illumination source for use in a television receiver which supplies a reduced heating current to the tubes of the receiver when in its non-receiving condition, said television set having therein a horizontal output transformer including a core member, said illumination source comprising, an electromagnetic coil winding disposed on the core member of said horizontal output transformer being inductively coupled to said transformer and an illumination device connected to said coil winding and being responsive to provide a light output upon the energization of said transformer when said receiver is in its receiving condition.

5. An illumination source for use in a television receiver which supplies a reduced heating current to the tubes of the receiver when in its non-receiving condition, said television set having therein a horizontal output transformer including a core member, said illumination source comprising, an electromagnetic coil wound about the core member of said horizontal output transformer being inductively coupled to said transformer and an electric bulb connected across said coil winding and being responsive to the R.M.S. voltage induced in said coil to provide a light output upon the energization of said transformer when said receiver is in its receiving condition.

References Cited

UNITED STATES PATENTS

| | | | |
|---|---|---|---|
| 2,441,732 | 5/1948 | Torsch | 315—19 |
| 2,679,550 | 5/1954 | Parker | 178—7.5 |

JOHN W. CALDWELL, *Acting Primary Examiner.*

R. L. RICHARDSON, *Assistant Examiner.*